May 9, 1933.  O. TERVO ET AL  1,907,467
CRANBERRY PICKER
Filed May 7, 1932  2 Sheets-Sheet 2
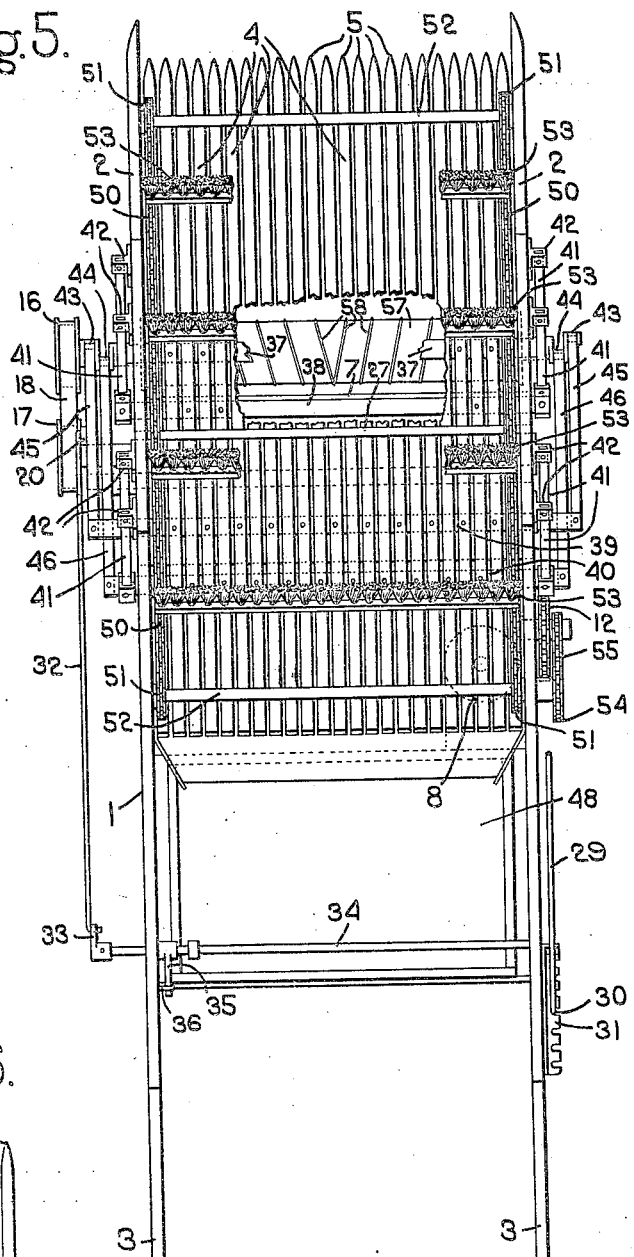
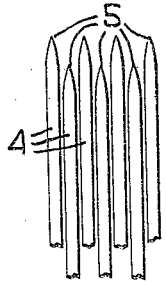
Inventors.
Oscar Tervo, deceased
by Anna M. Tervo, Administratrix
Wilfred B. Mathewson
by Heard Smith & Tennant.
Attys.

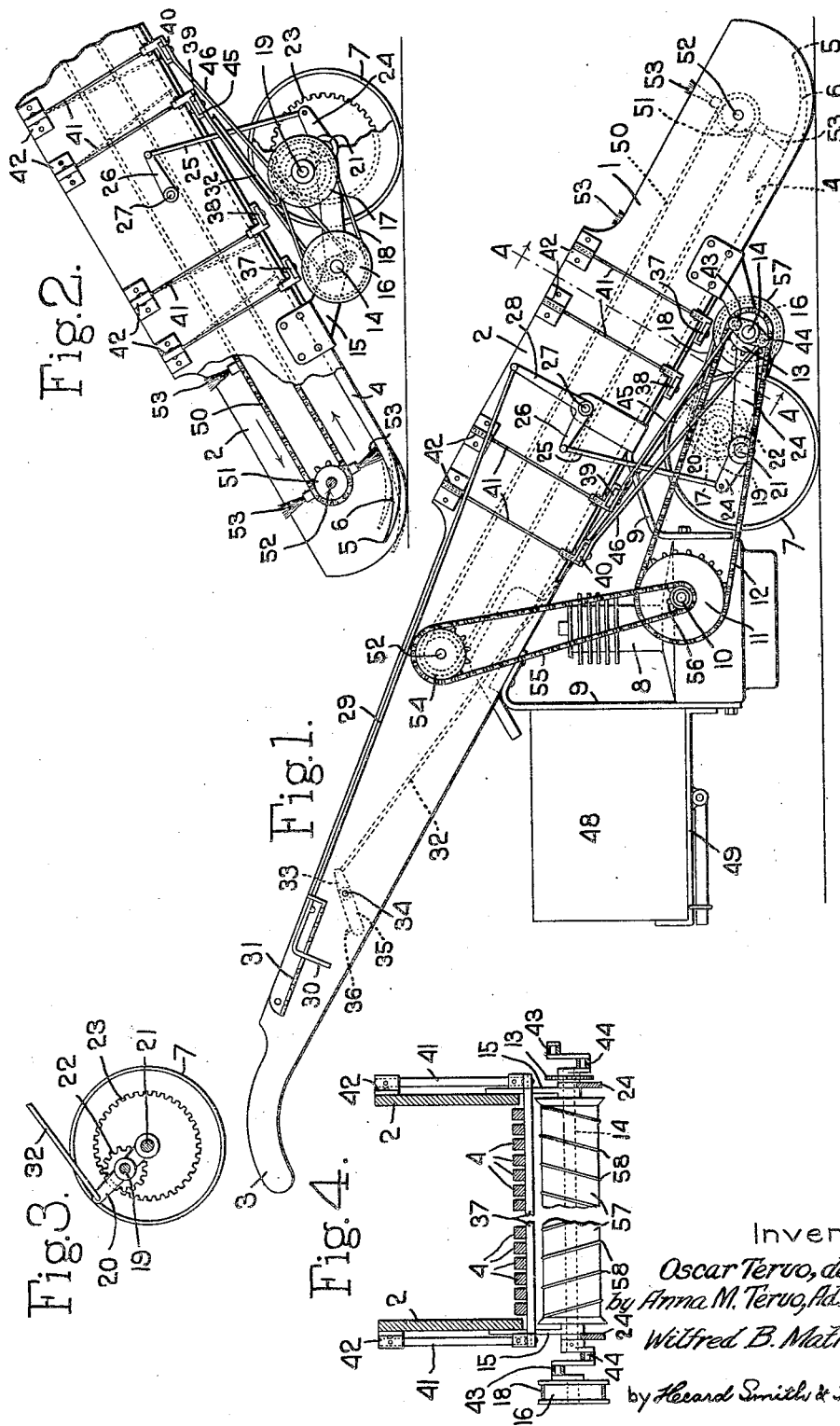

Patented May 9, 1933

1,907,467

UNITED STATES PATENT OFFICE

OSCAR TERVO, DECEASED, LATE OF NORTH WEYMOUTH, MASSACHUSETTS, BY ANNA M. TERVO, ADMINISTRATRIX, OF NORWAY, MAINE, AND WILFRED B. MATHEWSON, OF NORTH WEYMOUTH, MASSACHUSETTS

CRANBERRY PICKER

Application filed May 7, 1932. Serial No. 609,917.

This invention relates to cranberry pickers and has for its general object to provide a novel cranberry picker by which cranberries can be rapidly picked without injury to the vines.

Other objects of the invention are to provide a motor-driven cranberry picker having a body provided with picking fingers at its leading or advancing edge together with means for reciprocating said fingers so that as the cranberry picker is moved over the cranberry bog the reciprocations of the fingers serve to strip the berries from the vines without tearing or injuring the vines.

Other objects of the invention are to improve cranberry pickers in various ways and in the particulars hereinafter set forth.

In order to give an understanding of the invention there has been illustrated in the drawings a selected embodiment thereof which will now be described after which the novel features will be pointed out in the appended claims.

Fig. 1 is a side view of a cranberry picker embodying the invention;

Fig. 2 is a fragmentary view showing the cranberry picker from the opposite side and with parts broken out to better show the construction;

Fig. 3 is a detail showing the means for operatively connecting and disconnecting the motor from the traction members for the purpose of driving the picker forward or bringing it to rest;

Fig. 4 is a section on the line 4—4, Fig. 1;

Fig. 5 is a top plan view of the cranberry picker;

Fig. 6 is a fragmentary plan view of the operative end of the picking finger;

Fig. 7 is a side view of Fig. 6.

The cranberry picker herein illustrated comprises a body member 1 which is formed with the two sides 2 that terminate at the rear end in handles 3 by which the picker may be manipulated. The bottom of the body 1 is constituted by a plurality of picking fingers 4, these fingers having pointed front ends 5 which are located at the front edge of the body 1 and which are curved upwardly slightly as shown at 6.

The body is supported on a rolling support herein shown as a roll 7. This roll 7 has a shaft 21 journalled in arms 24 that are pivotally connected at their forward ends to bracket arms 15 secured to the under side of the frame. The rear ends of the arms 24 are connected by rods 25 to the body 1 and the connection is preferably an adjustable one so as to provide for raising or lowering the body relative to the roll.

As herein shown each rod 25 is connected at its upper end to an arm 26 fast on a shaft 27 which extends transversely through the body. At one end this shaft 27 is provided with an upstanding arm 28 to which is connected a link 29 that extends rearwardly to a point within convenient reach of the handles 3 and has its rear end downturned as shown at 30 to provide a handle by which it may be manipulated. One of the side pieces of the body is provided with a toothed locking member 31 with which the downturned end 30 of the connection 29 may be interlocked. By unlocking the rod 29 from the locking plate 31 and moving it forwardly the body will be lowered relative to the traction roll 7 and by moving said rod rearwardly the body will be elevated relative to the traction roll. By this simple construction the handles of the body may be placed at the elevation most convenient for the particular operator who is running the cranberry picker.

During the picking operation the body is rolled forward on its support to thrust the ends of the fingers into the vines and then the body may be tipped about its rolling support to elevate the fingers somewhat thus stripping the berries from the vines. The roll 7 is in the form of a traction roll by which the cranberry picker is propelled forward and it is herein shown as being driven from a suitable motor 8 in the form of an internal combustion engine which is supported underneath the body by means of supporting brackets 9. For driving the roll 7 the following mechanism is provided.

The motor 8 operates a shaft 10 carrying a sprocket wheel 11 around which passes a sprocket chain 12. This sprocket chain meshes with a sprocket wheel 13 fast on a shaft 14 which extends transversely of the body and is journalled in two bracket arms 15 depending from opposite sides of the body. On the opposite end of the shaft from that which carries the sprocket 13 is a belt pulley 16 which is belted to a pulley 17 by means of a driving belt 18. The pulley 17 is shown as mounted on a stud shaft 19 that is journalled in an arm 20 that is pivotally mounted on the shaft 21 of the roll 7. This stud shaft 19 has fast thereon a gear 22 which meshes with an internal gear 23 formed on the interior of the roll 7. The motor thus drives the shaft 14 and the latter drives the stud shaft 19 through the belt 18 and the stud shaft 19 drives the roll 7 through the gear 22, 23.

The driving connection between the motor 8 and the traction wheel 7 is rendered operative or inoperative by tightening or loosening the belt 18 and this can be accomplished by merely shifting the arm 20 forwardly or rearwardly. If the arm 20 is moved forwardly or to the left in Fig. 2 this will carry the pulley 17 toward the pulley 16 and will slacken the driving belt 18 sufficiently so that no power will be transmitted from the pulley 16 to the pulley 17. By swinging the arm 20 backwardly or to the right Fig. 2 the belt will be tightened so that the driving power will be transmitted from the pulley 16 to the pulley 17 and thence to the traction wheel 7.

To actuate the arm 20 to slacken or tighten the belt there is provided a link 32 which is pivotally connected at one end to the upper end of the arm 20 and at its rear end is connected to an arm 33 fast on a rock shaft 34 which is journalled in the side of the body. This rock shaft 34 has a handle 35 extending therefrom within convenient reach of the operator.

When the belt is sufficiently slack so that no power is transmitted from the belt 16 to the pulley 17 the handle 35 will rest against a stop 36. Whenever the operator wishes to advance the cranberry picker to cause the fingers 4 to be thrust into the vines he will bear downwardly on the handle 35 which will move the rod 32 rearwardly thereby tightening the belt 18 more or less. If the belt is partially tightened the traction roll 7 will be driven forward slowly because more or less slippage will occur between the belt 18 and the pulleys 16, 17 and by increasing the tightness of the belt so as to reduce the slippage the speed of forward movement of the traction roll 7 will be increased. By this simple means, therefore, the operator can control readily the speed of the traction wheel and hence the speed of movement of the cranberry picker over the bog.

In using the cranberry picker the operator will cause the body to be driven forward a short distance sufficient to thrust the ends of the fingers 4 into the vines and then he may bear down on the handles 3 and raise the front end slightly and then repeat these operations.

One feature of the present invention relates to means for vibrating the fingers 4 in the direction of their length as the picker is moved forward and as the fingers are being thrust into the vines by such forward movement. The fingers are shown in dotted lines in Fig. 1 and in full lines in Fig. 2 in their intermediate position and during their reciprocation they are moved forwardly from their intermediate position into the left hand dotted line position Fig. 2 and rearwardly into the right hand dotted line position in said figure. In other words, each finger 4 vibrates from one dotted line position to the other during the forward movement of the cranberry picker.

In the construction herein shown these picking fingers are divided into two groups and the fingers of each group reciprocate simultaneously but in an opposite direction to the fingers of the other group. In the preferred embodiment of the invention the alternate fingers 4 constitute one group and the other fingers constitute the other group so that during the reciprocating movement of the fingers any two adjacent fingers are moving in opposite directions and hence in one extreme position the alternate fingers will be projected forwardly to the left hand dotted line position Fig. 2 while the other fingers will be retracted rearwardly into the right hand dotted line position in said figure. In other words, the fingers in each extreme position will have the arrangement shown in Figs. 6 and 7.

By giving the fingers this reciprocating movement as the body is advanced over the bog said fingers will feel their way through the vines and strip the berries therefrom without appreciably injuring or tearing the vines.

Various means for thus reciprocating the picking fingers 4 may be provided for. As herein shown the fingers are secured to and supported by cross bars 37, 38, 39 and 40 extending underneath the body but movable relative to the side walls. These bars are supported at their ends on flexible suspenders 41 which are secured at their upper ends to the upper ends of the sides 2 as shown at 42. The alternate fingers 4 are bolted or otherwise secured to the two bars 37, 39 and the remaining fingers are bolted or screwed to the other bars 38 and 40. The fingers 4 are thus held in position to form the bottom of the body but are capable of movement in the direction of their length relative to the sides 2.

For reciprocating the fingers the shaft 14 is provided at each end with two cranks 43, 44.

The cranks 43 are connected by links 45 to the bar 39 while the cranks 44 are connected by links 46 to the bars 40. Hence as the shaft 14 is rotated from the engine the cranks 43 and 44 operate through the links 45 and 46 to move the bars 39 and 40 backwardly and forwardly but in opposite directions and since the fingers 4 are connected to these bars the fingers will be given this vibrating movement in the direction of their length. The fingers have this vibrating movement constantly so long as the engine is running and whether the picker is being advanced or not. This vibrating movement of the fingers enables them to feel their way into the vines without unduly disturbing the vines and hence with this device it is possible to pick the cranberries without injuring the vines.

The cranberry picker is provided with means for supporting a box 48 at the rear end of the fingers into which the berries may be deposited. This box is illustrated as being carried by supporting arms 49 secured to the engine bracket 9.

Means are also provided for feeding the berries as they are picked from the forward to the rear end of the fingers into the box 48. For this purpose there is provided within the body an endless chain device comprising two endless chains 50 which pass around sprocket wheels 51 that are mounted on shafts 52 journalled in the sides 2 of the body. These endless chains 50 carry brushes 53 which extend across the body of the picker and during the movement of the endless chain device in the direction of the arrow Fig. 2 the brushes serve to carry the berries along the vibrating fingers 4 in the direction of their length and to push the berries off the upper ends of the fingers from whence they will drop into the box 48.

The rear shaft 52 has a sprocket wheel 54 fast thereon that is geared by means of a sprocket chain 55 to a sprocket wheel 56 on the engine shaft 10.

The shaft 14 is shown as having a roll 57 fast thereon which is provided with spiral ribs 58. These ribs incline in opposite directions from the center of the roll and the purpose of this construction is to provide means to assist in laying the vines down flat after the berries have been stripped therefrom and before the traction roll rolls over them.

What is claimed.

1. In a cranberry picker, the combination with a body, of a rolling support therefor, a plurality of picking fingers at the forward edge of the support, and means to vibrate the fingers as the support is moved forward over the vines.

2. In a cranberry picker, the combination with a body having at its forward edge a plurality of picking fingers, of a rolling support for the body, and means to vibrate the fingers in the direction of movement of the body.

3. In a cranberry picker, the combination with a body, of a rolling support therefor, said body having a plurality of picking fingers at its forward edge, and means to vibrate all the fingers in the direction of movement of the body with part of the fingers vibrating oppositely to the remaining fingers.

4. In a cranberry picker, the combination with a body, the bottom of which is formed of picking fingers, of a rolling support for the body, means to vibrate the fingers in the direction of their length with adjacent fingers moving in opposite directions.

5. In a cranberry picker, the combination with a body comprising two sides and a bottom formed of separate picking fingers, of a rolling support for the body, means to propel the rolling support forward, and means to vibrate the fingers in the direction of their length.

6. In a cranberry picker, the combination with a body comprising sides and picking fingers forming the bottom of the body, of a rolling support for the body, a motor carried by said body, means actuated by the motor to propel the rolling support forwardly, and means also actuated by the motor to vibrate the fingers in the direction of their length.

7. In a cranberry picker, the combination with a body comprising sides and picking fingers forming the bottom of the body, of a rolling support for the body, a motor carried by said body, means actuated by the motor to propel the rolling support forwardly, and means also actuated by the motor to vibrate the fingers in the direction of their length with adjacent fingers moving in opposite directions.

8. In a cranberry picker, the combination with a body comprising sides and picking fingers forming the bottom of the body, of a rolling support for the body, a motor carried by said body, means actuated by the motor to propel the rolling support forwardly, means also actuated by the motor to vibrate the fingers in the direction of their length, a receptacle carried by the body, and means actuated by said motor to carry the picked berries from the picking ends of the fingers into the receptacle.

9. In a cranberry picker, the combination with a body comprising sides and picking fingers forming the bottom of the body, of a rolling support for the body, a motor carried by said body, means actuated by the motor to propel the rolling support forwardly, means also actuated by the motor to vibrate the fingers in the direction of their length, a receptacle carried by the body, and an endless chain device actuated by the motor and carrying brushes to convey the picked berries from the picking end of the fingers into said receptacle.

10. In a cranberry picker, the combination with a body having picking fingers at its forward edge, of a traction roller on which the body is supported, means for propelling the traction roller, and means for raising and lowering the body relative to the traction roller.

11. In a cranberry picker, the combination with a body having picking fingers at its forward edge, of a traction roller supporting the body, a motor carried by the body, driving connections between the motor and the traction roller including a driving belt, and means to subject the belt to different degrees of tightness thereby to control the speed of movement of the traction roller.

12. In a cranberry picker, the combination with a body having picking fingers at its forward edge, of a traction roller on which the body is supported, a motor carried by said body, operative connections between said motor and traction roller comprising a pulley constantly driven by the motor, a second pulley mounted eccentrically of the traction roller but geared thereto, a driving belt connecting said pulleys, and means for shifting the position of said second pulley to render the driving belt operative or inoperative.

In testimony whereof we have signed our names to this specification.

ANNA M. TERVO,
*Administratrix of the Estate of Oscar Tervo, Deceased.*
WILFRED B. MATHEWSON.